No. 662,968. Patented Dec. 4, 1900.
H. G. ROTH.
SAMPLING TUBE FOR CHEESE.
(Application filed Aug. 31, 1900.)
(No Model.)
Fig. 1.
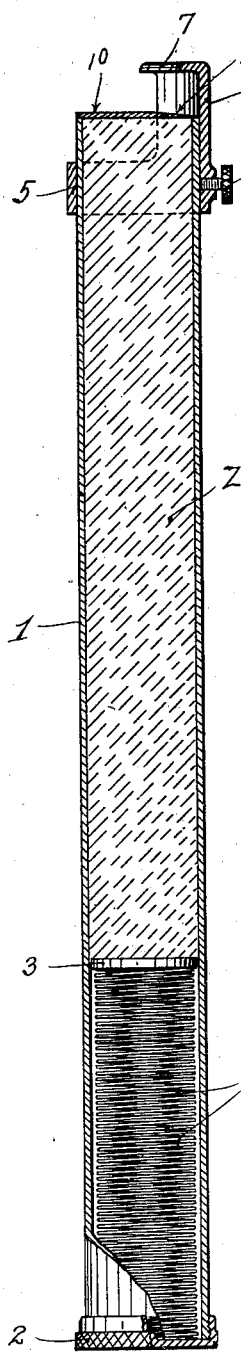
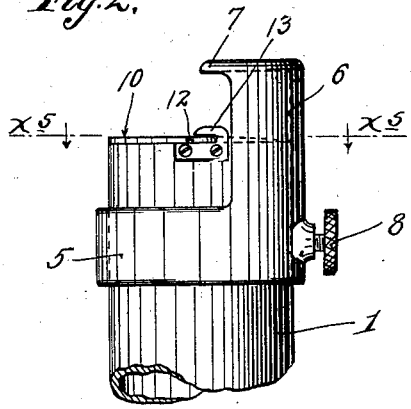
Fig. 2.
Fig. 4.
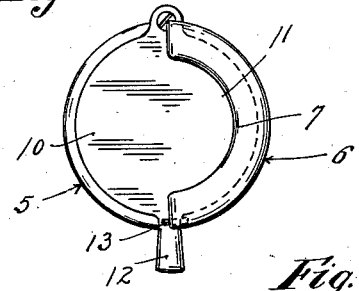
Fig. 3.
Fig. 5.
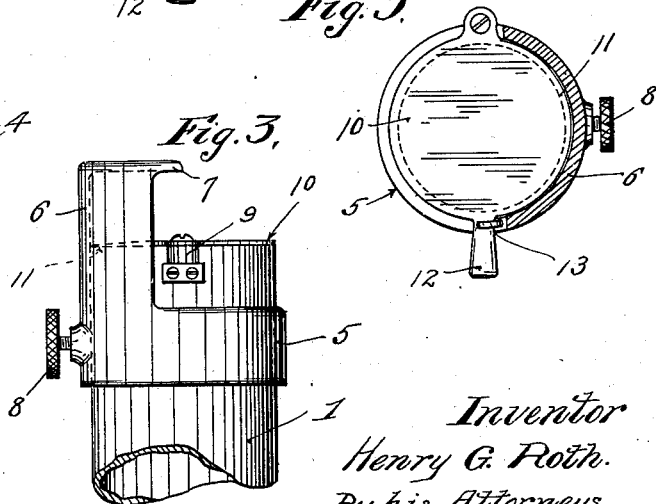
Witnesses.
Harry Kilgore
Anne S. Read
Inventor
Henry G. Roth.
By his Attorneys.
Williamson & Merchant

UNITED STATES PATENT OFFICE.

HENRY G. ROTH, OF MINNEAPOLIS, MINNESOTA.

SAMPLING-TUBE FOR CHEESE.

SPECIFICATION forming part of Letters Patent No. 662,968, dated December 4, 1900.

Application filed August 31, 1900. Serial No. 28,640. (No model.)

*To all whom it may concern:*

Be it known that I, HENRY G. ROTH, a citizen of the United States, residing at Minneapolis, in the county of Hennepin and State of Minnesota, have invented certain new and useful Improvements in Sampling-Tubes for Cheese; and I do hereby declare the following to be a full, clear, and exact description of the invention, such as will enable others skilled in the art to which it appertains to make and use the same.

My present invention has for its object to provide an improved sampling case or tube for cheese, butter, &c.; and to this end it consists of the novel devices and combinations of devices hereinafter described, and defined in the claims. This sampling case or tube was especially designed for use in connection with a cheese-cutting device disclosed in the claims in an application for United States Letters Patent, Serial No. 28,639, filed by me of date August 31, 1900, entitled "Cheese-cutting device," but is nevertheless capable of general use independently thereof. In my said improved cheese-cutting device quite a large hole is necessarily cut through the cake of cheese in order to properly position the cake on the centering-tube of the device. I therefore designed my present device to receive and contain the cylindrical plug cut from the cheese, with the intention of using the said plug as a sample. Samples of the cheese are required, and in this way a loss of the cheese is obviated and the cake itself need not be cut from time to time when samples are required.

The invention is illustrated in the accompanying drawings, wherein like characters indicate like parts throughout the several views.

Figure 1 shows the complete device, principally in longitudinal section taken on the axis thereof, some parts being shown in full. Fig. 2 shows the outer end of the device. Fig. 3 is a view of the same parts shown in Fig. 2 looking at the same from an opposite direction. Fig. 4 is a plan view looking at the end of the tube, and Fig. 5 is a transverse section taken on the line $x^5$ $x^5$ of Fig. 3.

The numeral 1 indicates the tubular body of the device, the same being provided at its butt-end with a removable cap 2, shown as screw-threaded thereon.

The numeral 3 indicates a follower which works within the tube 1 and is subject to a long coiled spring 4, compressed between the same and the cap 2. At its outer or delivery end the tube 1 is provided with a sliding collar 5, which has a segmental extension 6, that terminates in an inturned segmental stop-flange 7. The collar 5 is adjustably held wherever set by a set-screw 8. Pivoted to a lug 9 on the same end of the tube 1 is a combined lid and knife 10, of disk-like form, having approximately the same diameter as the tube 1. This disk 10 is sharpened throughout approximately one-half of its circumference, as indicated at 11, and it is provided with a small handle or finger-piece 12, by means of which it may be moved. When the disk 10 is closed, the finger-piece 12 engages under a retaining-hook 13, which holds it against outward lateral movements.

The character $z$ indicates the cylindrical plug of cheese which is to be used as a sample.

To place the plug of cheese within the tube 1, the cap 2, follower 3, and spring 4 are removed, and after the plug has been inserted the said parts are replaced, as shown in Fig. 1. The plug of cheese is then put under strain to move toward the other end of the tube, and it is pressed against the knife disk or lid 10. The collar 5 is adjusted on the tube 1, so as to set the stop-flange 7 the desired distance from the end of the tube to give the required thickness to the sample of cheese to be cut. When a section of the plug is to be cut for a sample, the knife-disk is moved into an open position, so as to permit the plug of cheese to be forced outward against the stop-flange 7. Then by the closing movement of the knife-disk a section of the cheese is cut off, and by the same closing movement of the said disk 10 the tube is tightly closed, so that the remainder of the cheese will be contained within a tightly-closed case.

This device, while especially designed as a cheese case or sample-tube, may of course be used to contain samples of butter and various other edibles.

It will also be understood that the device above described is capable of considerable modification within the scope of my invention.

What I claim, and desire to secure by Letters Patent of the United States, is as follows:

1. A sampling-case for cheese, &c., comprising the tube 1, the collar 5 adjustable on one end of said tube, and provided with the projecting segment 6 terminating in the stop-flange 7, the disk-like knife 10 pivoted at 9 to one side of said tube and serving as a closure for that end of the tube, and a spring-pressed follower in the other end of said tube, substantially as described.

2. In a sample-case for cheese, &c., the combination with the tube 1 having the spring-pressed follower, at one end, and the removable cap 2 permitting of the removal thereof, of the disk-like knife 10 pivoted to one side of the delivery end of the tube as at 9, said knife having the finger-piece 12 and said tube having the retaining-hook 13, and the ring 5 on said tube 1 formed with the projecting segment 6 terminating in the stop-flange 7, said parts operating substantially as described.

In testimony whereof I affix my signature in presence of two witnesses.

HENRY G. ROTH.

Witnesses:
 B. AUGER,
 H. G. VICK.